Dec. 7, 1943.  L. F. LITTWIN  2,336,268
ELECTRIC VALVE TRANSLATING CIRCUIT
Filed July 11, 1942
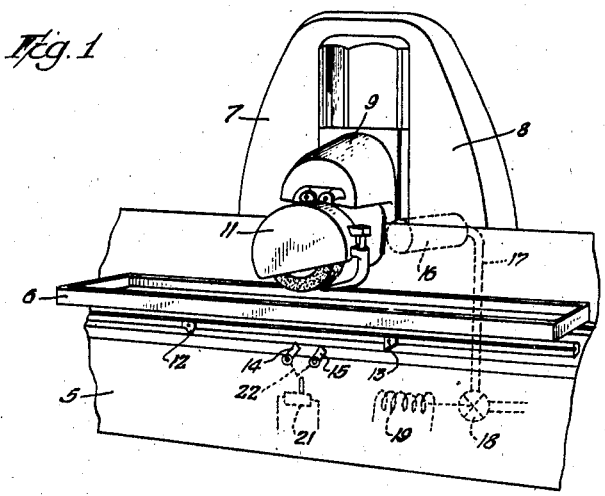
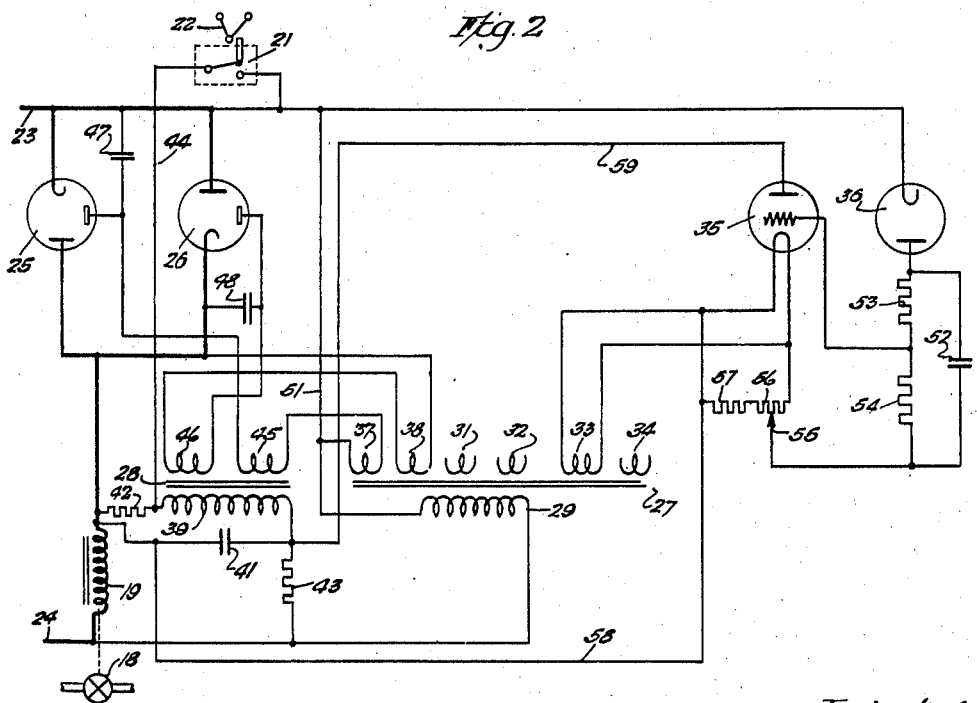
Inventor:
Leo F. Littwin
By:
Sheridan, Davis & Caygill
Attys.

Patented Dec. 7, 1943

2,336,268

UNITED STATES PATENT OFFICE 2,336,268

ELECTRIC VALVE TRANSLATING CIRCUIT

Leo F. Littwin, Chicago, Ill.

Application July 11, 1942, Serial No. 450,645

11 Claims. (Cl. 250—27)

My invention relates to an electric valve translating circuit and more particularly to an electric valve circuit for controlling certain operations of a machine tool.

In machine tools having a reciprocating traveling work table and a tool head operable transversely with respect to the work table, it has been found desirable to provide means for automatically advancing the tool head each time that the work table reciprocates or each time that the work table moves in either direction. Heretofore, this has been accomplished by an apparatus utilizing an electric circuit which was closed each time that the work table completed its travel or its cycle of operation, and was opened by electric contact devices and relays as the cutting head or tool head was advanced a predetermined amount. Such circuits employed electromagnetic relays and a series of electric contacts spaced along the way or the path of travel of the tool head. It was found that the variations in the times of operation of the relays was sufficiently great to introduce deleterious inaccuracies in the operation of the machine tools, and that furthermore it was difficult to maintain the contacts clean so as to prevent delayed operation due to variations in contact resistance. In accordance with my invention a tool head is advanced at a certain constant rate of travel, and the distance which the tool head is advanced is determined by controlling the time interval during which the tool head travels without the use of relays or contacts. This is accomplished by utilizing an electric valve translating circuit which may be controlled so as to supply electric power for predetermined periods of time thereby to control the distance through which a tool head is advanced at a certain constant rate of travel.

It is therefore an object of my invention to provide an improved electric valve translating circuit for controlling the operation of a machine tool which will overcome the above mentioned disadvantages.

It is another object of my invention to provide an improved electric valve circuit for selectively predetermining the time interval of operation of a device, irrespective of the variations in the intervals between successive operations.

A still further object of my invention is to provide an improved control circuit for an electric valve translating apparatus which will be reliable in operation and simple and economical to manufacture.

Other and further objects of my invention will become more readily apparent by reference to the following description taken in connection with the accompanying drawing wherein, Figure 1 is a perspective view of the essential parts of a machine tool to which the present invention is applied; and Figure 2 is a circuit diagram of the electric valve translating apparatus and the control circuit therefor which embodies the present invention.

Referring more particularly to Figure 1, there are shown certain essential elements of a machine tool, and these include a supporting frame 5 upon which a work table 6 is arranged to travel on horizontal ways. The work table 6 is actuated by such mechanism as is common in the art and which may be variable in speed and which can be controlled so as to determine the length of travel of the work table. Supported toward the rear of the base or frame 5 are two vertical columns 7 and 8 provided with suitable slides or ways to guide the travel of a tool head support 9, which in turn is provided with suitable slides or ways in which a tool head 11 operates. Thus, by means of the vertical slides or ways formed in the columns 7 and 8, the tool head 11 may be positioned at the desired elevation with respect to the work table 6. In the figure, tool head 11 is shown as being a grinding wheel provided with a shield and lubricating tube, but it is to be understood that this tool head may comprise any other cutting or finishing tool.

In operation, the work table 6 moves back and forth between certain limits which may be predetermined by a pair of adjustable limit stops 12 and 13 suitably supported beneath the front edge of the work table 6. These limit stops actuate a pair of switch levers 14 and 15 which are connected to some means for controlling the reversal of the direction of operation of the work table 6. As the stock on the work table 6 is moved relative to the cutting head 11, it is desired to automatically move the tool head 11 across the stock by small increments of distance. This may be accomplished by any suitable means operating at a constant rate of speed such as a hydraulic piston 16, shown in dotted lines, which is supplied through a pipe 17 and a valve 18. The valve 18 is opened and closed by a solenoid 19. The solenoid 19 is energized by an electric circuit which is controlled by a switch 21 actuated by suitable switch actuating toggle means 22 connected to the limit switch levers 14 and 15. In the arrangement shown, each actuation of either of the levers 14 or 15 produces actuation of the toggle 22 thereby closing the switch 21 for a brief time interval.

Referring more particularly to Figure 2, there is shown an electric valve translating apparatus which is energized from a suitable source of alternating current by means of the conductors 23 and 24. Connected between the conductors 23 and 24 in series with the solenoid 19 are a pair of reversely connected controlled electric valves 25 and 26 which control the supply of energy to the solenoid 19 thereby controlling the operation of the valve 18. The valves 25 and 26 may comprise any one of a number of types of controlled electric valves well known in the art, but for purposes of illustration there is shown a form of electric valve having an anode, a cathode, and a control electrode of the capacitor control type. Valves of this general type may have control characteristics which require certain relations between the control potentials applied, but for the purpose of simplification, in the explanation of the circuit, it will be assumed that the valves herein used have control characteristics such that they will become conductive whenever the control electrode is at zero or slightly positive potential with respect to the cathode. Whenever the valves 25 and 26 supply energy to the solenoid 19, the valve 18 permits fluid to be supplied to the hydraulic cylinder 16 thereby to advance the tool head 11 at a certain constant rate. The time interval during which the valve 18 is open which determines the distance which the tool head will advance, is in turn determined by the length of time of conductivity of the valves 25 and 26.

In order to provide definite periods of conductivity for the valves 25 and 26, there is provided a control circuit which includes a transformer 27 which supplies potential tending to maintain the valves non-conductive and a transformer 28 which supplies potential of such sign and magnitude as to overcome the effect of the potential supplied by the transformer 27. The transformer 27 is provided with a primary winding 29 directly connected between the conductors 23 and 24. The transformer 27 is provided with a plurality of secondary windings, of which windings 31, 32, 33, 34 supply current for heating the cathodes of the electric valves 25 and 26 and also of auxiliary valve 35 and a rectifier valve 36. The secondary windings 37 and 38 of the transformer 27 are connected to the control electrodes of the valves 25 and 26, respectively. A capacitor 41 is connected in parallel with the transformer winding 39 and a resistor 42 which is in series with this transformer winding. The primary winding 39, the series resistor 42, and the capacitor 41 in parallel thereto are connected in series with a resistor 43; and these circuit elements are in parallel with the solenoid 19. The juncture between the resistor 42 and the primary winding is connected by means of a conductor 44 through the switch 21 to the electric conductor 23. The transformer 28 is provided with a pair of secondary windings 45 and 46 which are connected in series with the secondary windings 37 and 38 respectively of the transformer 27.

As is customary, in order to improve the control of the control electrodes of the valves 25 and 26, each of the control electrodes thereof is connected by a capacitor 47 and 48 respectively to their respective cathodes. The control circuit for the control electrode of the valve 25 may now be traced from the cathode through conductor 51, the secondary winding 37 of the transformer 27, and through the secondary winding 45 of the transformer 28 to the control electrode. The control electrode of the valve 26 is connected to a control circuit which may be traced through the secondary winding 46 of the transformer 28, and the secondary winding 38 of the transformer 27 to the cathode of the valve.

In order to determine the periods during which the voltages supplied by the transformers 27 and 28 are effective in the control circuits of valves 25 and 26, there is provided a half-wave rectifier 36 connected so as to charge a capacitor 52 which is connected in parallel with a pair of resistors or impedances 53 and 54. The common juncture between the resistor 54 and the capacitor 52 is connected to an adjustable contact 55 operating on a resistor 56 connected in series with another resistor 57, the end terminal of which is connected through a conductor 58 to the common juncture between the resistor 42 and the solenoid 19. During the time that the valves 25 and 26 are non-conductive, the alternating current potential supplied across the conductors 23 and 24 is sufficient to cause the rectifier 36 to be conductive thereby to charge the capacitor 52. The manner in which this potential becomes effective can best be understood by tracing the following circuit from the conductor 23 to the cathode of the rectifier 36, from the anode of the rectifier 36 to the parallel circuit comprising the capacitor 52 and the serially connected resistors 53 and 54, through the adjustable contact 55, a portion of the resistor 56, the resistor 57, the conductor 58, the resistor 42, the solenoid 19, to the conductor 24. Whenever electric valves 25 and 26 are conductive, the potential appearing across the rectifier 36 is insufficient to maintain conductivity of the rectifier so that it no longer supplies energy to charge the capacitor 52. The capacitor 52 thereupon discharges through the resistors 53 and 54 thereby building up a potential across these resistors. The resistor 54 is connected between the control electrode of an auxiliary valve 35 and the cathode thereof by means of the adjustable contact 55 and the resistor 56. The resistors 56 and 57 are connected across the secondary winding 33 of the transformer 27, which winding is connected to the cathode of the auxiliary valve 35.

The auxiliary valve 35 is effectively connected across the primary winding 39 of the transformer 28 since the conductor 58 from the cathode of valve 35 is connected through resistor 42 to one terminal of the winding 39. The anode of the auxiliary valve 35 is connected through a conductor 59 to the other side of the primary winding 39. During the time that the capacitor 52 is being charged by the rectifier 36, the voltage appearing across the resistor 54 is of such sign and magnitude as to maintain non-conductive the electric valve 35. During this time also there is no potential appearing across the primary winding 39 of the transformer 28. As soon as electric valves 25 and 26 become conductive, a potential appears across the primary winding 39 of the transformer 38 because of the current flowing through the solenoid 19. Thus, at this instant potential is supplied between the anode and cathode of the electric valve 35. Also at the instant of conductivity of the valves 25 and 26, the rectifier 36 ceases to function so that the capacitor 52 discharges through the resistors 53 and 54 thereby reversing the polarity of the potential appearing across the resistor 54. When this potential reaches a critical amount, the control electrode of the auxiliary valve 35 permits the valve to become conductive. The particular instant at which this auxiliary valve becomes conductive may be controlled by adjustment of the position of the contact 55 on the resistor 56 since it will be apparent that a certain amount of alternating current potential is present in the circuit of the control electrode.

The operation of the electric valve translating apparatus will be more readily understood by reference to the following description of the operation thereof. The electric valves 25 and 26 are normally maintained non-conductive by the bias potential supplied by the secondary windings 37 and 38 of the transformer 27, the primary winding of which is directly connected between the conductors 23 and 24. During the time that the main valves 25 and 26 are non-conductive, the alternating current potential appearing across the electric rectifier 36 is sufficient to cause this to be conductive thereby supplying energy to charge the capacitor 52. It will be remembered that the travel of the work table 6 of the machine shown in Figure 1 causes the adjustable limit stop members 12 and 13 to actuate the limit switch members 14 and 15 so that at the end of each travel of the table 6 the toggle 22 causes the switch 21 to be closed for a brief interval of time. In the circuit shown in Figure 2 the switch 21 is connected between the conductor 23 and one side of the primary winding 39 of the transformer 28. The other side of the primary winding 39 is connected to the conductor 24 through a resistor 42 which will limit the current therethrough, and the resistor 42 will limit the flow of alternating current through the solenoid 19 so as to produce no appreciable effect thereon. Thus during the time that the switch 21 is closed potential is supplied to the primary winding 39 so that alternating current potential appears in the secondary windings 45 and 46 which will be of such sign and magnitude as to render ineffective the negative biasing potential supplied by the secondary windings 37 and 38 which are connected in the control circuits for electric valves 25 and 26. Thus the control electrodes of the main valves 25 and 26 are subjected to a specific potential which positively insures the conductivity of at least one of these valves. Even though the switch 21 were closed for such a short time interval as to permit only one of the valves to become conductive, the other valve thereupon will also become conductive because as soon as any valve is conductive, a potential is developed across the solenoid 19. A portion of this potential appears across the primary winding 39 of the transformer 38 so that potentials are applied by the secondary windings 45 and 46 to insure the continuation of the conductivity of these valves.

At the time of the initiation of conductivity of the electric valves 25 and 26, the rectifier 36 stops supplying energy to the capacitor 52 so that the capacitor discharges through the resistors 53 and 54. Since the current flowing through the solenoid 19 develops a potential across the transformer winding 39, an alternating potential now appears across the auxiliary valve 35. By adjustment of the contact 55 on the resistor 56, there is predetermined a time constant which determines the period of conductivity of the valves 25 and 26. As soon as the potential developed across the resistor 54 is sufficient to permit the auxiliary valve 35 to become conductive, the primary winding 39 of the transformer 28 is then shunted by a relatively low impedance so that the potential appearing across the primary winding 39 is insufficient to permit the secondary windings 45 and 46 to supply sufficient voltage to maintain the conductivity of the electric valves 25 and 26. Since the potentials supplied by the transformer windings 45 and 46 are insufficient, the negative bias potentials supplied by the secondary windings 37 and 38 of the transformer 27 now cause the electric valves 25 and 26 to become non-conductive. As soon as the valves 25 and 26 become non-conductive, there again appears a potential across the rectifier 36 sufficient to cause it to become conductive thereby charging the capacitor 52 so that the circuit is in readiness for another cycle of operation.

From the above explanation of the operation of the control circuits for the electric valves 25 and 26, it is apparent that the periods of conductivity of the electric valves 25 and 26 may be selectively predetermined, thereby to control the time interval for which the valve 18 is held in an open position by the solenoid 19. Thus, where the tool head is a grinder such as shown in Figure 1, it is moved to a new position each time that the stock on the work table 6 completely passes the tool head 11. Obviously, of course, where other tools are used in place of the grinder, the control arrangement may be modified so that the switch 21 is actuated only upon the movement of the work table 6 in a single direction rather than in both directions. Irrespective of the time or any variations thereof between successive closings of the switch 21, the conductivity period for the valves 25 and 26 will always be the same. An arrangement such as shown and described has been known to limit the possibilities of inaccuracy of operation since the control is accurate to 1/120 of a second or within the limits of a half cycle of alternating current. In one embodiment it was found that the tool head 11 could be moved by any desired increments within an accuracy of 1/10,000 of an inch.

While for the purposes of illustrating and describing the invention, a particular circuit arrangement has been shown as applied to a particular machine tool, it, of course, is to be understood that I do not wish to be limited thereto, since obviously modifications may be made in the circuit arrangement and in the apparatus to which the circuit may be applied without departing from the spirit and scope of my invention as set forth in the appended claims.

I claim:

1. An electric valve translating system comprising an alternating current source, a work circuit, a pair of reversely connected controlled electric valves interconnecting said source and said work circuit, a control circuit including means for supplying to the control electrodes of said valves an alternating current potential for biasing said valves non-conductive, means for supplying to said circuit an alternating current potential of such sign and magnitude as to render ineffective said biasing potential, a switch for connecting said means to said source for an interval sufficient to render conductive said valves, said means thereupon being energized from said work circuit, and means responsive to the initiation of conductivity of said valves for determining the duration of conductivity of said valves.

2. In an electric valve translating system having a pair of reversely connected controlled electric valves interconnecting an alternating current source and a work circuit, a control circuit including means energized from said source for supplying to the control electrodes of said valves a potential for biasing said valves non-conductive, means for supplying to said circuit an alternating potential of such sign and magnitude as to render ineffective said biasing potential, means for energizing said first means from said source for an interval sufficient to render conductive said valves, said means thereupon being energized from said work circuit, and means responsive to the initiation of conductivity of said valves for determining the duration of conductivity including an auxiliary valve connected to reduce the potential supplied by said second means.

3. A control circuit for an electric valve translating system interconnecting an alternating current source and a work circuit, said system including a pair of reversely connected controlled electric valves, said control circuit comprising means for supplying an alternating potential to bias said valves non-conductive, a transformer for supplying an alternating potential of such sign and magnitude as to render ineffective said biasing potential, means for energizing said transformer from said source for an interval sufficient to initiate conductivity of said valves, said transformer being connected so that thereafter it is energized from said work circuit, and means responsive to the initiation of conductivity of said valves for determining the period of conductivity by controlling the potential supplied by said transformer.

4. An electric valve translating system comprising a pair of reversely connected valves interconnecting an alternating current source and a work circuit, a control circuit including means energized from said source for supplying an alternating current potential to bias said valves non-conductive, means for supplying a second alternating potential of such sign and magnitude as to render ineffective said biasing potential, a switch for connecting said latter means to said source for an interval to render conductive said valves, and means responsive to the conductivity of said valves for reducing said second potential after a predetermined time of conductivity of said valves to stop the conductivity thereof until said switch is again actuated.

5. A control circuit for an electric valve translating system having a pair of reversely connected valves interconnecting an alternating current source and a work circuit, comprising means energized from said source for supplying a potential to bias said valves non-conductive, a transformer for supplying a second alternating potential of such sign and magnitude as to render ineffective said biasing potential, said transformer being connected so as to be energized in response to current flowing in said work circuit, and means for energizing said transformer from said source for an interval sufficient to render conductive said valves.

6. A control circuit for an electric valve translating system having a pair of reversely connected valves interconnecting an alternating current source and a work circuit, comprising means energized from said source for supplying a potential to bias said valves non-conductive, a transformer for supplying a second alternating potential of such sign and magnitude as to render ineffective said biasing potential, said transformer being connected so as to be energized in response to current flowing in said work circuit, means for energizing said transformer from said source for an interval sufficient to render conductive said valves, and means responsive to the initiation of conductivity of said valves for determining the period during which said transformer is energized in response to current flowing in said work circuit.

7. In an electric valve translating system having a pair of reversely connected controlled valves connected between a source of alternating current and a work circuit, a control circuit including a source of bias potential tending to maintain said valves non-conductive, means for supplying an alternating potential to maintain said valves conductive, means for connecting said first means to said source for an interval sufficient to initiate conductivity of said valves, and circuit connections for causing said first means thereafter to be energized from said work circuit, and means operative after a predetermined time interval after said initiation of conductivity of said valves for shunting said first means.

8. In an electric valve translating system having a pair of reversely connected controlled electric valves connected between a source of alternating potential and a work circuit, a control circuit including a source of bias potential tending to maintain said valves non-conductive, means for supplying an alternating potential to maintain said valves conductive, a switch for connecting said means to said source for an interval sufficient to initiate conductivity of said valves, and circuit connections for causing said means thereafter to be energized from said work circuit, and auxiliary electric valve means operative after a predetermined time interval for shunting said first means.

9. In an electric valve translating system having a pair of reversely connected controlled electric valves interconnecting an alternating current source and a work circuit, a control circuit including a source of alternating bias potential tending to maintain said valves non-conductive, means for supplying an alternating potential to render said bias potential ineffective, a switch for connecting said means to said source for an interval sufficient to initiate conductivity of said valves, and circuit connections for causing said means thereafter to be energized from said work circuit, and auxiliary electric valve means operative after a predetermined time interval after the initiation of conductivity of said valves for shunting said first means, said auxiliary electric valve having a control electrode connected to an impedance arranged in parallel to a capacitor, said capacitor being connected so as to be charged by said source only during the non-conductive periods of said first valves.

10. In an electric valve translating system having a pair of reversely connected controlled electric valves interconnecting a work circuit and an alternating current source, means energized from said source for supplying an alternating bias potential tending to maintain said valves non-conductive, means for supplying second alternating potential of such sign and magnitude as to render said first potential ineffective, a switch for connecting said second means to said source for an interval sufficient to initiate conductivity of said valves, circuit connections which cause said second means thereafter to be energized from said work circuit, and means responsive to the initiation of conductivity of said valves to determine the duration of conductivity, said means including an auxiliary control electric valve connected across said second means to reduce the potential supplied thereby, said auxiliary electric valve having a control electrode connected to an impedance arranged in parallel to a capacitor, and means for charging said capacitor only during the non-conductive periods of said first valves.

11. In an electric valve translating system having a pair of reversely connected controlled electric valves interconnecting an alternating current source and a work circuit, a control circuit including means energized from said source for supplying an alternating bias potential tending to maintain said valves non-conductive, a transformer for supplying an alternating potential of such sign and magnitude as to render said first potential ineffective, a switch for connecting said transformer to said source for an interval sufficient to initiate conductivity of said valves, said transformer being provided with connections so that thereafter said transformer will be energized from said work circuit, and means responsive to the initiation of conductivity of said valve to determine the duration of said conductivity including an auxiliary electric valve operative after a predetermined time interval to reduce the potential supplied by said transformer, said auxiliary electric valve having a control electrode connected to an impedance arranged in parallel to a capacitor, said capacitor being connected so as to be charged only during the non-conductive periods of said first valves by a rectifier connected to said source.

LEO F. LITTWIN.